United States Patent
Anderson et al.

(10) Patent No.: US 11,698,323 B2
(45) Date of Patent: Jul. 11, 2023

(54) METHODS AND SYSTEM FOR DETERMINING A CONTROL LOAD USING STATISTICAL ANALYSIS

(71) Applicant: Palo Alto Research Center Incorporated, Palo Alto, CA (US)

(72) Inventors: Spenser Anderson, Mountain View, CA (US); Hong Yu, Fremont, CA (US); Peter Kiesel, Palo Alto, CA (US); Ajay Raghavan, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 410 days.

(21) Appl. No.: 16/821,356

(22) Filed: Mar. 17, 2020

(65) Prior Publication Data

US 2021/0293658 A1 Sep. 23, 2021

(51) Int. Cl.
*G01M 5/00* (2006.01)
*G01B 11/16* (2006.01)
*G06N 5/022* (2023.01)
*G06N 7/01* (2023.01)

(52) U.S. Cl.
CPC .......... *G01M 5/0033* (2013.01); *G01B 11/16* (2013.01); *G06N 5/022* (2013.01); *G06N 7/01* (2023.01)

(58) Field of Classification Search
CPC ..... G01M 5/0033; G01B 11/16; G06N 5/022; G06N 7/005; G06N 7/01
See application file for complete search history.

(56) References Cited

U.S. PATENT DOCUMENTS

| | | | |
|---|---|---|---|
| 2006/0170535 A1* | 8/2006 | Watters | G01K 5/483 340/870.07 |
| 2009/0132199 A1* | 5/2009 | Parker | G01C 15/002 702/158 |
| 2013/0245879 A1* | 9/2013 | Armijo Torres | G01M 5/0016 702/34 |
| 2013/0275059 A1* | 10/2013 | Bernhard | G01L 1/00 702/42 |
| 2014/0008132 A1* | 1/2014 | Kamamann | G01G 19/08 177/136 |
| 2015/0198502 A1* | 7/2015 | Phares | G01M 5/0008 702/42 |

(Continued)

FOREIGN PATENT DOCUMENTS

WO WO-2021156784 A1 * 8/2021 ............ E01D 19/00

OTHER PUBLICATIONS

European Search Report from EP Application No. 21160574.6 dated Jul. 22, 2021, 6 pages.

(Continued)

*Primary Examiner* — Alexander Satanovsky
*Assistant Examiner* — Lyudmila Zaykova-Feldman
(74) *Attorney, Agent, or Firm* — Mueting Raasch Group

(57) ABSTRACT

A set of load responses of an asset for a sample of traffic loading events caused by objects of unknown weight is measured. At least one statistical parameter is determined from the set of load responses. A corresponding statistical parameter of known object weights loading the asset is determined. An object weight is assigned to a load response of the set of load responses based on correlation of the extracted statistical parameter to the corresponding statistical parameter.

20 Claims, 7 Drawing Sheets

(56) References Cited

U.S. PATENT DOCUMENTS

| | | | |
|---|---|---|---|
| 2016/0274001 A1* | 9/2016 | Parker | G01C 15/002 |
| 2017/0108456 A1* | 4/2017 | Alizadeh | G01M 5/0083 |
| 2017/0363504 A1* | 12/2017 | Winant | G01M 5/0008 |
| 2018/0067637 A1* | 3/2018 | Hay | G06T 7/0016 |
| 2019/0212223 A1* | 7/2019 | Kusaka | E01C 23/01 |
| 2019/0308693 A9* | 10/2019 | Lee | E21B 17/01 |

OTHER PUBLICATIONS

Khateeb et al., "Structural Health Monitoring of a Cable-Stayed Bridge Using Regularly Conducted Diagnostic Load Tests", Frontiers in Built Environment, 5, 2019, 41.

Deng et al., "Automated bridge load rating determination utilizing strain response due to ambient traffic trucks", Engineering Structures, 117, 2016, 101-117.

* cited by examiner

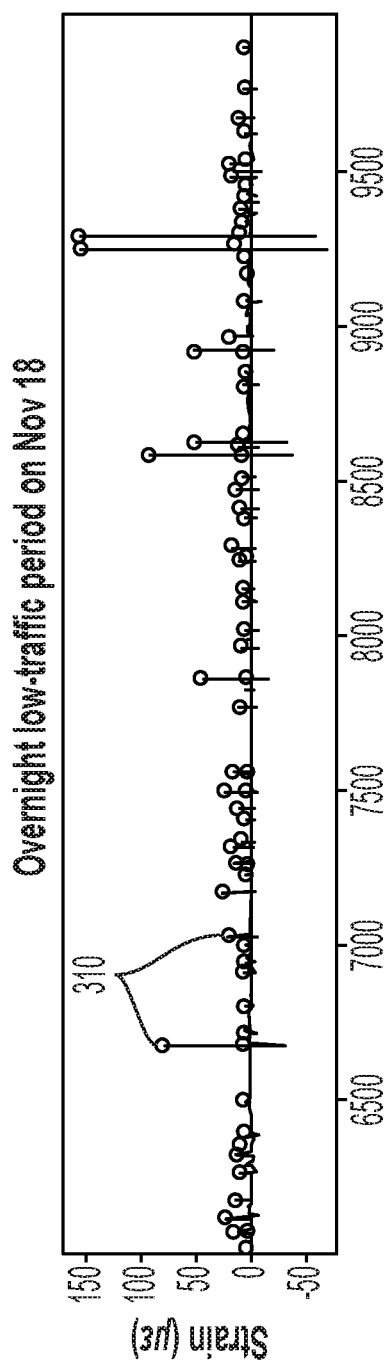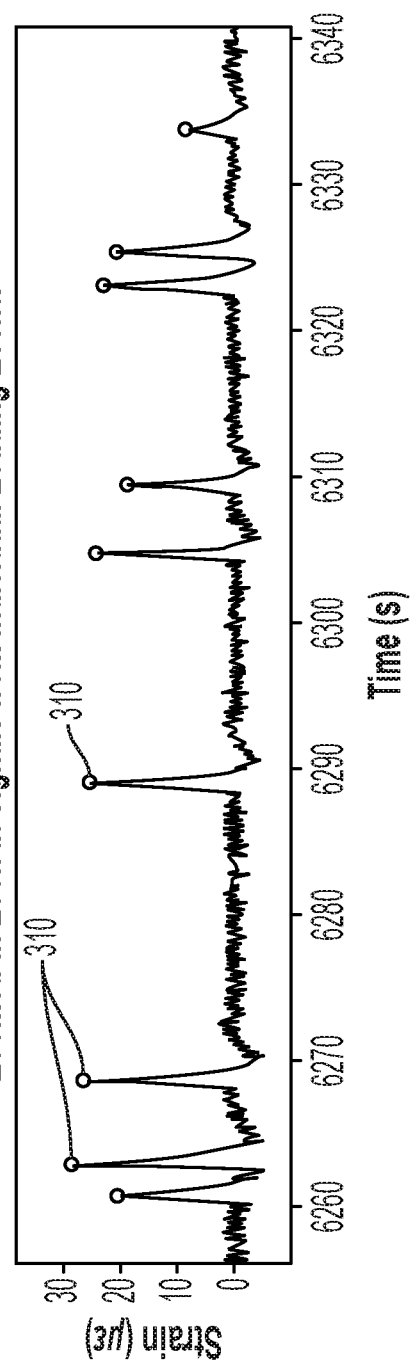
FIG. 3
FIG. 4

METHODS AND SYSTEM FOR DETERMINING A CONTROL LOAD USING STATISTICAL ANALYSIS

TECHNICAL FIELD

This application relates generally to techniques for structural health monitoring. The application also relates to components, devices, systems, and methods pertaining to such techniques.

BACKGROUND

Structural health monitoring is a large and growing field of study that aims to use sensors installed on assets to extract useful information about the health or condition of the structure.

SUMMARY

Embodiments described herein involve a method comprising measuring a set of load responses of an asset for a sample of traffic loading events caused by objects of unknown weight. At least one statistical parameter is determined from the set of load responses. A corresponding statistical parameter of known object weights loading the asset is determined. An object weight is assigned to a load response of the set of load responses based on correlation of the extracted statistical parameter to the corresponding statistical parameter.

Embodiments involve a system comprising sensors disposed on an asset and configured to measure a set of load responses of the asset for a sample of traffic loading events caused by objects of unknown weight. The system comprises a database of known object weights loading the asset. The system comprises a processor configured to determine at least one statistical parameter from the set of load responses. A corresponding statistical parameter of known object weights loading the asset is determined. An object weight is assigned to a load response of the set of load responses based on correlation of the extracted statistical parameter to the corresponding statistical parameter.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 3 shows data taken from an example 3-lane bridge on a major suburban road, outfitted with over 100 fiber optic fiber Bragg grating (FBG) strain sensors in accordance with embodiments described herein;

FIG. 4 shows a zoomed-in view of the data shown in FIG. 3 in accordance with embodiments described herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
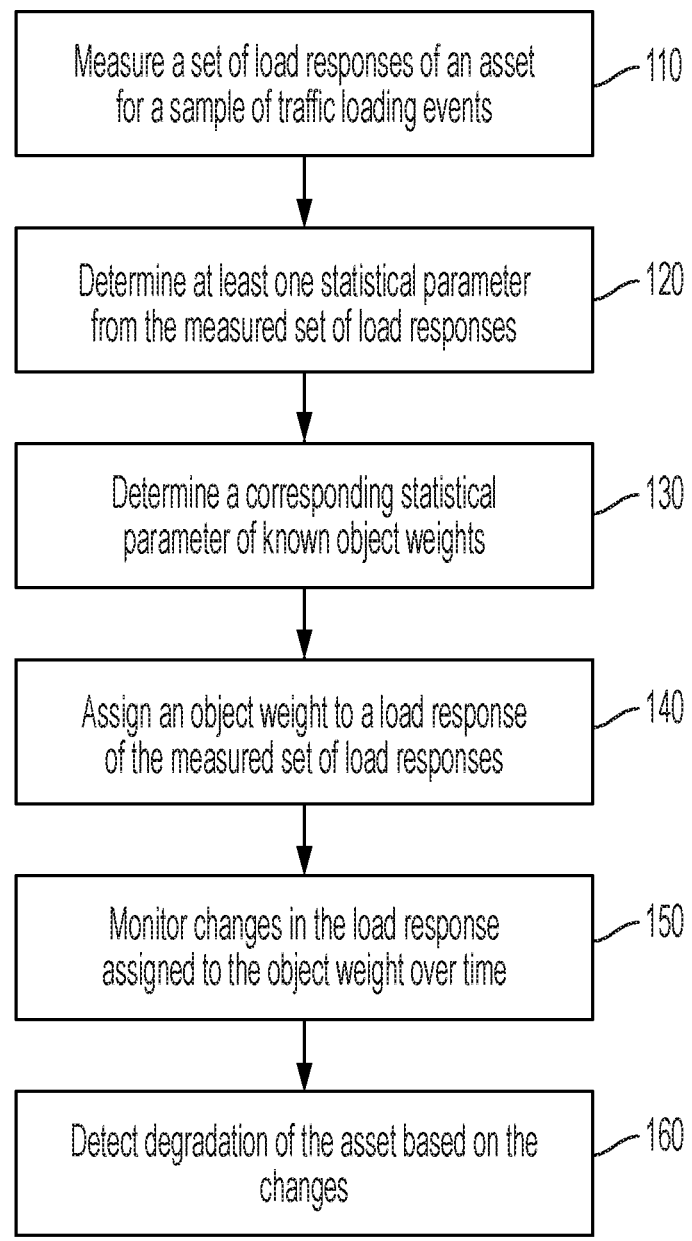
FIG. 1 shows a process for determining a control load from a sample of traffic loading events by comparison against known traffic statistics in accordance with embodiments described herein.

Structural health monitoring is a large and growing field of study that aims to use sensors installed on assets, i.e., structures, to extract useful information about the health or condition of the structure. According to various embodiments described herein, these assets are built with the purpose of supporting loads. An approach to structural health monitoring is to measure the response of the asset to loading events and infer the state of the asset from observing its response to loads. The assets can include any structure that can be loaded with objects. For example, the asset may include one or more of a road, a bridge, a runway, a port wharf, and a cable structure. While many embodiments described herein use the example of vehicles driving over a bridge structure, it is to be understood that any of the methods and systems described herein can be applied to any type of structure that can be loaded with objects. The objects may be any object that can apply a load to the asset. For example, the objects can include one or more of motor vehicles, trains, pedestrians, aircrafts, boats, cable cars, and ski lifts.

Many analyses that can be performed on a structure that has been outfitted with sensors that measure its response to loading (e.g. strain sensors, accelerometers, displacement sensors) provide utility when they measure the response of the structure to known or controlled loading conditions. For example, if sensors measure a particularly large strain in response to a passing truck, but the weight of the passing truck is not known, it is not immediately clear whether the large magnitude of the measured strain is due to the truck being heavy, or due to the structure becoming overly flexible. For this reason, analysis techniques on instrumented structures may use controlled load testing, where a known load is applied by, for example, driving a truck with a known weight and dimensions across the structure. This allows the sensors to capture a known load-response relationship, which can help with analyses such as model validation/calibration. This type of controlled load testing may be inconvenient and/or expensive. It may involve personnel to operate the controlled load over the structure at a known time, and it may involve applying the controlled load when there are no other unknown vehicle loads on the structure (i.e., bridge closures or night-time work, or both).

Embodiments described herein involve a process for using a sample of strain-response data coming from many ambient (i.e. natural/non-controlled) traffic loading events to infer a "known" load for the purpose of doing analyses that would ordinarily involve a controlled load test. Loading from traffic can be collected without needing to determine the weight and type of each vehicle. Then, in a post-processing step done after collecting these unlabeled loading events, some of those loading events can be identified with weights and vehicle types by comparison against traffic statistics. These now-labeled loading events can be used as controlled load tests. Example applications include finite element model calibration, data-driven model construction, model validation, and load or fatigue rating of bridges and/or other structures.

According to embodiments described herein, a first approach involves using a controlled or known test load that is applied to the structure, and the response to this test load is measured. This establishes a known force-response relationship that can be either used to directly build a data-driven model of the structural behavior, or (more commonly) can be used to calibrate a model (such as a finite element model) of the structure. For instance, uncertain parameters of the structural model such as stiffnesses of various components, or boundary conditions of various structural elements, may be tuned so that when the known load is applied to the model, it produces results that are sufficiently similar to the responses measured on the actual physical structure.

According to various implementations, a second approach involves measuring the response of the structure to a sample of loads with some assumed distribution (e.g., response of the structure to many traffic loading events is measured, where some statistics about what that traffic distribution looks like is known). Then the model of the structure is tuned so that when traffic loads with the assumed distribution are applied to the model, the model's output has a distribution sufficiently similar to the distribution of responses measured on the actual structure. This approach may involve applying to the structural model many loading events drawn from an assumed distribution, which requires higher computational cost than the first approach above, which applies a small number of controlled loads. The distributions may then be tuned to match. The tuning may involve substantially more complexity and analytical sophistication compared to the first approach, which involves no statistical considerations.

Embodiments described herein may use a combination of the above approaches along with additional analysis. The first approach described above (applying a known load) is simpler for analysis, due to it involving a single, targeted measurement, though may be expensive to implement in practice, as mentioned above. The approach proposed herein uses known statistics of the traffic loads to identify one or more known loads contained within a sample of many loading events. That is, some of the loading events that were captured without knowledge of object weight can be labelled with inferred weights. These inferred "known" loads can then be fed into the simple analyses such as those described in the first approach above. This opens up a broad array of popular analysis types that involve a controlled load test, even when no controlled load testing has been performed, as long as the traffic loads can be assumed to follow some distribution. This approach is also simpler than the complicated analysis carried out in the second approach described above.

FIG. 1 shows a process for determining a control load from a sample of traffic loading events by comparison against known traffic statistics in accordance with embodiments described herein. A set of load responses of an asset for a sample of traffic loading events caused by objects of unknown weight are measured 110. At least one statistical parameter is determined 120 from the set of load responses. A corresponding statistical parameter of known object weights loading the asset is determined 130. An object weight is assigned 140 to a load response of the set of load responses based on correlation of the extracted statistical parameter to the corresponding statistical parameter. In some cases, additional object weights are assigned to additional load responses. Changes in the load response assigned to the object weight are monitored 150 over time. Degradation of the asset is detected 160 based on the changes.

According to various embodiments, determining the statistical parameter from the set of load responses comprises extracting the mode of the set of load responses. In some cases, determining the corresponding statistical parameter of known object weights loading the asset comprises determining a mode of the known object weights. The mode of the object weights may be assigned to the mode of the load responses.

According to various implementations, determining the statistical parameter from the set of load responses comprises extracting a median and/or mean of the set of load responses and determining the corresponding statistical parameter of the known object weights loading the asset comprises determining a median and/or mean of the known object weights. The median of the object weights is assigned to the median and/or mean of the load responses.

In some cases, the statistical parameter from the set of load responses comprises calculating a median and an inter-quartile range of the set of load responses and calculating a confidence interval of the median. Determining the corresponding statistical parameter of the known object weights loading the asset comprises calculating a median of the known object weights. Assigning the vehicle weight to the load response comprises assigning the median of the object weights to a load response other than the median of the load responses, the load response being within the confidence interval. According to various configurations, assigning the object weight to the load response comprises assigning the median of the object weights to a maximum load response within the confidence interval.

Figure 2:
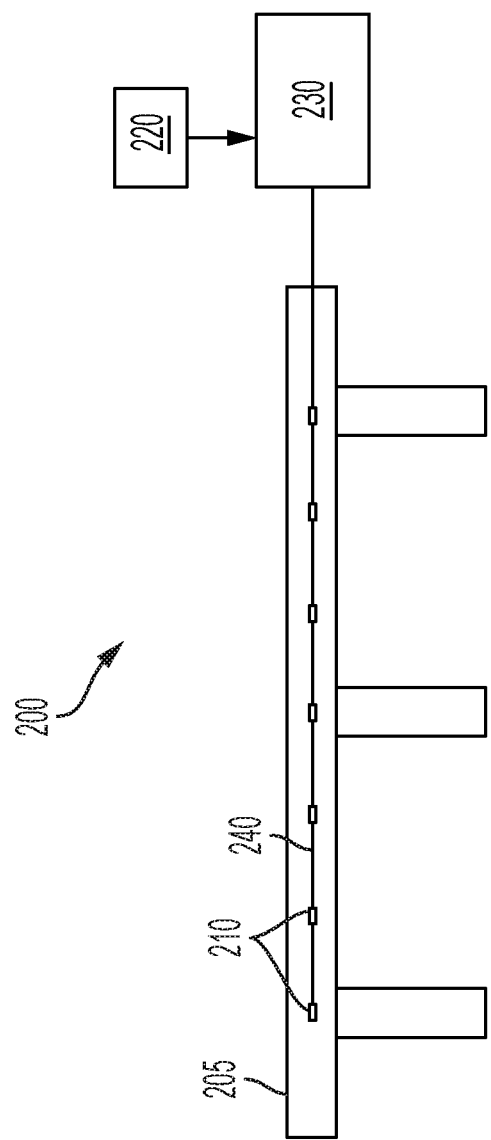
FIG. 2 illustrates a system capable of determining a control load from a sample of traffic loading events by comparison against known traffic statistics in accordance with embodiments described herein.

FIG. 2 illustrates a system capable of determining a control load from a sample of traffic loading events by comparison against known traffic statistics in accordance with embodiments described herein. A plurality of sensors 210 are disposed on an asset 205. The sensors may be any type of sensor capable of measuring load responses. According to various embodiments, the plurality of sensors are optical sensors. For example, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used. While the embodiment shown in FIG. 2 depicts seven sensors, it is to be understood that any number of sensors may be used. For example, over 100 sensors may be disposed along the asset.

The plurality of sensors 210 are configured to measure a set of load responses of the asset 205 for a sample of traffic loading events caused by objects of unknown weight. A processor 230 coupled to the sensors 210 is configured to determine at least one statistical parameter from the set of load responses. The processor 230 receives known object weights from a database 220 and uses the known object weights to determine a corresponding statistical parameter of the known object weights. The processor 230 is configured to assign an object weight to a load response of the set of load responses based on correlation of the extracted statistical parameter to the corresponding statistical parameter.

FIGS. 3 and 4 show data is taken from an example 3-lane bridge on a major suburban road, outfitted with over 100 fiber optic fiber Bragg grating (FBG) strain sensors. Strain signals were collected from all sensors on the bridge over a 1-hour period in the late-night hours. Individual loading events 310 are identified with a peak-finding algorithm run on the strain signals. A late-nighttime period is chosen because during this low-traffic period, traffic is sparse enough that vehicles tend to drive over the bridge one at a time as can be observed more clearly in the zoomed-in view shown in FIG. 4. This results in individual, isolated loading events that will be simpler to correlate against traffic statistics.

Embodiments described herein match statistics of the collected sample against assumed statistics of the traffic over the asset. This assumed traffic may be determined based on known train schedules in the case of a train bridge, for example. Once the sensor signals have been collected and the loading events have been extracted, the pertinent statistics are computed on the sample. For example, one approach to this matching could be to take the modal loading event magnitude in the sample and infer that this likely corresponds to the modal vehicle weight from the regional vehicle weight distribution. Appropriate statistical analyses could derive error bounds on such an inference.

Some embodiments described herein may model incoming traffic as independent samples drawn from the overall regional vehicle distribution. Sampling distribution theory can give a confidence interval for the mean peak strain from the true population, which would correspond to the mean vehicle weight in the true population. To do this type of inference, the median and inter-quartile ranges of the sample loading event magnitudes can be calculated. In some cases, the mean and the standard deviations of the sample loading event magnitudes are calculated.

Figure 5:
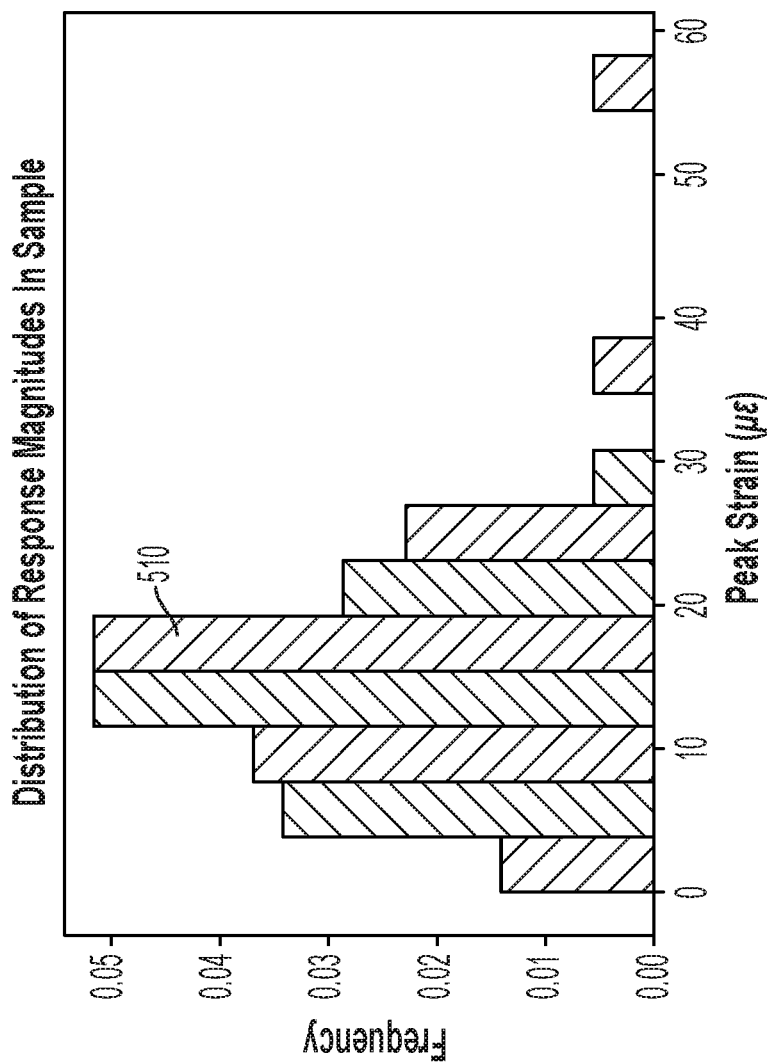
FIG. 5 illustrates an example histogram of loading event strain magnitudes from an example bridge in accordance with embodiments described herein.

An example histogram of loading event strain magnitudes from the example bridge is shown in FIG. 5. An approximately normal weight distribution is seen in the sample. Variation in peak height is likely driven by variation in weight of the vehicles driving over the bridge. Therefore, the histogram of FIG. 5 can be seen as a scaled histogram of vehicle weights in the sample.

According to embodiments described herein, a statistical inference procedure can be used to infer labels for at least some of the loading events using known statistics of the population distribution. Consider the example inference procedure where it is assumed that the modal loading event magnitude in the sample corresponds to the modal vehicle weight in the regional traffic distribution. The loading events that were placed in the tallest bin 510 of the histogram in FIG. 5 can be labelled with the modal weight in the regional vehicle weight distribution. A confidence interval can be calculated for the population median and/or mean for loading event peak height (which may directly correspond to vehicle weight). Loading events corresponding to the larger strain magnitudes in this confidence range could be labelled with the population mean vehicle weight. The confidence interval may account for the fact that there is some chance that our load responses are all from small cars or large cars due to random chance. Since we are not certain of the range of responses from the mean and/or median-weight object as reflected by the confidence interval above, the worst case for the structure would be that the mean and/or median object is causing a large response. So, for the sake of conservatism, the responses whose peak match the upper end of the confidence range may be assigned to the weight of the mean object.

These are two particular examples of how particular loading events in the sample can be labelled with weights by performing some statistical inference procedure to match the sample of loading events against the known distribution of vehicles in the region. Many similar procedures could be used, each making different assumptions and resulting in different error bounds and levels of conservatism.

Figure 6A:
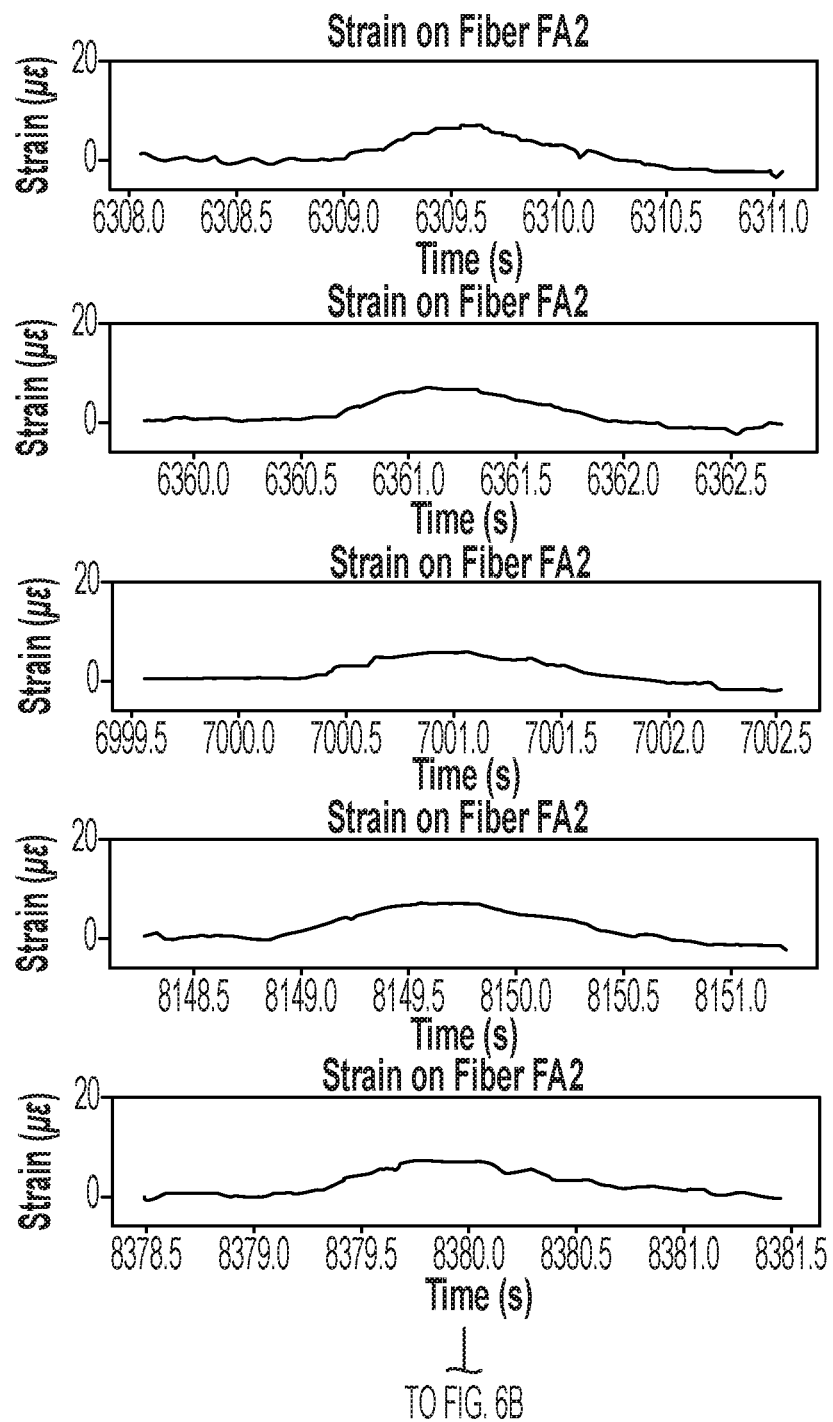
FIGS. 6A and 6B show plots of example loading event signals on two strain sensors on the example bridge, where loading events have been extracted from the tallest bin of the histogram of FIG. 5 in accordance with embodiments described herein.
Figure 6B:
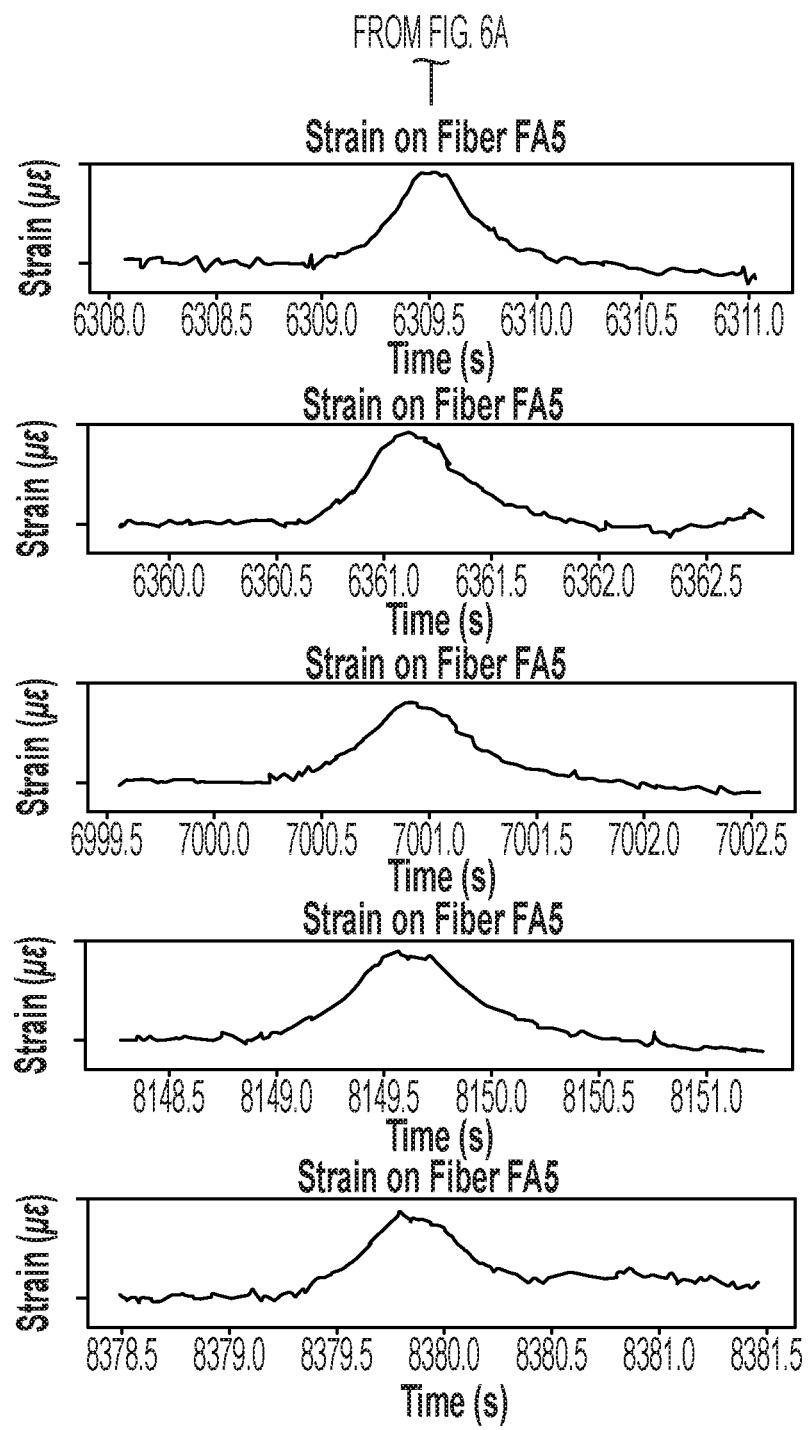

Once at least some of the loading events in the sample have been labelled with an inferred weight, the signals measured corresponding to those loading events can be extracted and used for downstream analyses. For example, the plots in FIGS. 6A and 6B show loading event signals on two strain sensors on the example bridge, where loading events have been extracted from the tallest bin of the histogram of FIG. 5. It can be inferred that this bin likely corresponds to vehicles with the most common weight in the known distribution of regional vehicle weights. The most common weight in a region can be determined in various ways. For example, the most common vehicle weight may be determined based on sales data for the region. Other methods may be used to determine the most common vehicle type such as traffic statistics. This correlation with the most common vehicle weight can be taken as the structure's measured response to a vehicle with the most common weight among regional vehicles. These loading event signals have been assigned a "known"/inferred vehicle weight, so they can be used in lieu of controlled load testing for tasks such as data-driven model construction or model tuning.

Figure 7:
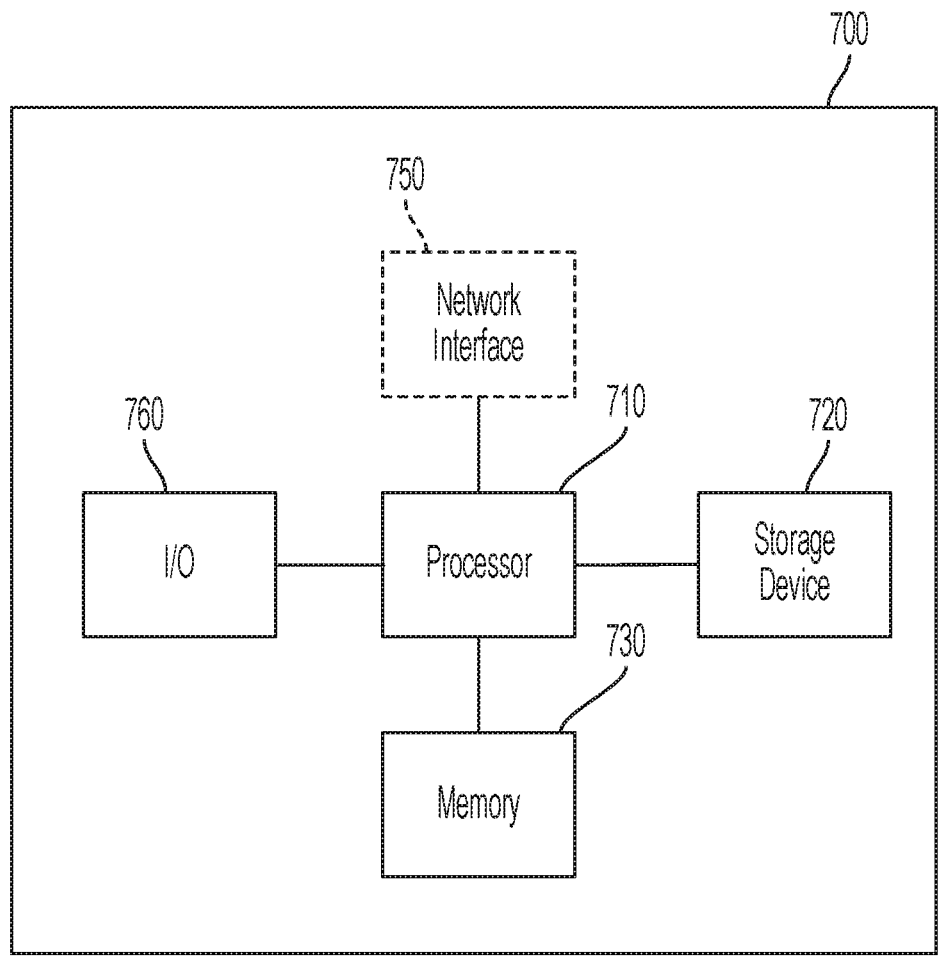
FIG. 7 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 7. Computer 700 contains a processor 710, which controls the overall operation of the computer 700 by executing computer program instructions which define such operation. It is to be understood that the processor 710 can include any type of device capable of executing instructions. For example, the processor 710 may include one or more of a central processing unit (CPU), a graphical processing unit (GPU), a field-programmable gate array (FPGA), and an application-specific integrated circuit (ASIC). The computer program instructions may be stored in a storage device 720 (e.g., magnetic disk) and loaded into memory 730 when execution of the computer program instructions is desired. Thus, the steps of the methods described herein may be defined by the computer program instructions stored in the memory 730 and controlled by the processor 710 executing the computer program instructions. According to embodiments described herein, the computer 700 may perform method steps as part of a server or cloud-based service. The computer 700 may include one or more network interfaces 750 for communicating with other devices via a network. The computer 700 also includes other input/output devices 760 that enable user interaction with the computer 700 (e.g., display, keyboard, mouse, speakers, buttons, etc). FIG. 7 is a high level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
   measuring a set of load responses of an asset for a sample of traffic loading events caused by objects of unknown weight passing over the asset;
   determining at least one statistical parameter from the set of load responses;
   determining a corresponding statistical parameter of known object weights of a population of objects assumed to be loading the asset;
   assigning an object weight to a load response of the set of load responses based on correlation of the at least one statistical parameter to the corresponding statistical parameter; and
   inferring a structural health of the asset from observing the load response and the object weight.

2. The method of claim 1, wherein:
   the statistical parameter from the set of load responses comprises a mode of the set of load responses;
   the corresponding statistical parameter of the known object weights loading the asset comprises a mode of the known object weights; and
   assigning the object weight to the load response comprises assigning the mode of the known object weights to the mode of the set of the load responses.

3. The method of claim 1, wherein:
   the statistical parameter from the set of load responses comprises a median of the set of load responses;
   the corresponding statistical parameter of the known object weights loading the asset comprises a median of the known object weights; and
   assigning the object weight to the load response comprises assigning the median of the object weights to the median of the set of the load responses.

4. The method of claim 1, wherein:
   determining the statistical parameter from the set of load responses comprises:
     calculating a median and an inter-quartile range of the set of load responses; and
     calculating a confidence interval of the median;
   determining the corresponding statistical parameter of the known object weights loading the asset comprises calculating a median of the known object weights; and
   assigning the object weight to the load response comprises assigning the median of the object weights to a load response other than the median of the load responses, the load response being within the confidence interval.

5. The method of claim 4, wherein assigning the object weight to the load response comprises assigning the median of the object weights to a maximum load response within the confidence interval.

6. The method of claim 1, further comprising assigning additional object weights to additional load responses.

7. The method of claim 1, further comprising:
   monitoring changes in the load response assigned to the object weight over time; and
   detecting degradation of the asset based on the changes.

8. The method of claim 1, wherein the asset is a road, a bridge, runway, a port wharf or a cable structure.

9. The method of claim 1, wherein the objects comprise one or more of vehicles, pedestrians, planes, boats, cable cars, and ski lifts.

10. A system, comprising:
    sensors disposed on an asset and configured to measure a set of load responses of the asset for a sample of traffic loading events caused by objects of unknown weight passing over the asset;
    a database of known object weights of a population of objects assumed to be loading the asset; and
    a processor configured to:
      determine at least one statistical parameter from the set of load responses;
      determine a corresponding statistical parameter of the known object weights loading the asset;
      assign an object weight to a load response of the set of load responses based on correlation of the at least one statistical parameter to the corresponding statistical parameter; and
      infer a structural health of the asset from observing the load response and the object weight.

11. The system of claim 10, wherein the sensors are optical sensors.

12. The system of claim 10, wherein the sensors are fiber Bragg grating (FBG) sensors.

13. The system of claim 10, wherein:
    the statistical parameter from the set of load responses comprises a mode of the set of load responses;
    the corresponding statistical parameter of the known object weights loading the asset comprises a mode of the known object weights; and
    assigning the object weight to the load response comprises assigning the mode of the known object weights to the mode of the set of the load responses.

14. The system of claim 10, wherein:
    the statistical parameter from the set of load responses comprises a median of the set of load responses;
    the corresponding statistical parameter of the known object weights loading the asset comprises a median of the known object weights; and
    assign the object weight to the load response comprises assigning the median of the object weights to the median of the set of the load responses.

15. The system of claim 10, wherein determining the statistical parameter from the set of load responses comprises:
    calculating a median and an inter-quartile range of the set of load responses; and
    calculating a confidence interval of the median, wherein the processor is configured to:

calculate a median of the known object weights; and
assign the median of the object weights to a load response other than the median of the load responses, the load response being within the confidence interval.

16. The system of claim 15, wherein assigning the object weight to the load response comprises assigning the median of the object weights to a maximum load response within the confidence interval.

17. The system of claim 10, wherein the processor is configured to assign additional object weights to additional load responses.

18. The system of claim 10, wherein the processor is configured to:
monitor changes in the load response assigned to the object weight over time; and
detect degradation of the asset based on the changes.

19. The system of claim 10, wherein the asset is a road, a bridge, runway, a port wharf or a cable structure.

20. The system of claim 10, wherein the objects comprise one or more of vehicles, pedestrians, planes, boats, cable cars, and ski lifts.

\* \* \* \* \*